No. 764,655. PATENTED JULY 12, 1904.
M. ALTSTOCK.
MECHANISM FOR PULLING POTATO HALMS.
APPLICATION FILED AUG. 13, 1903.
NO MODEL.
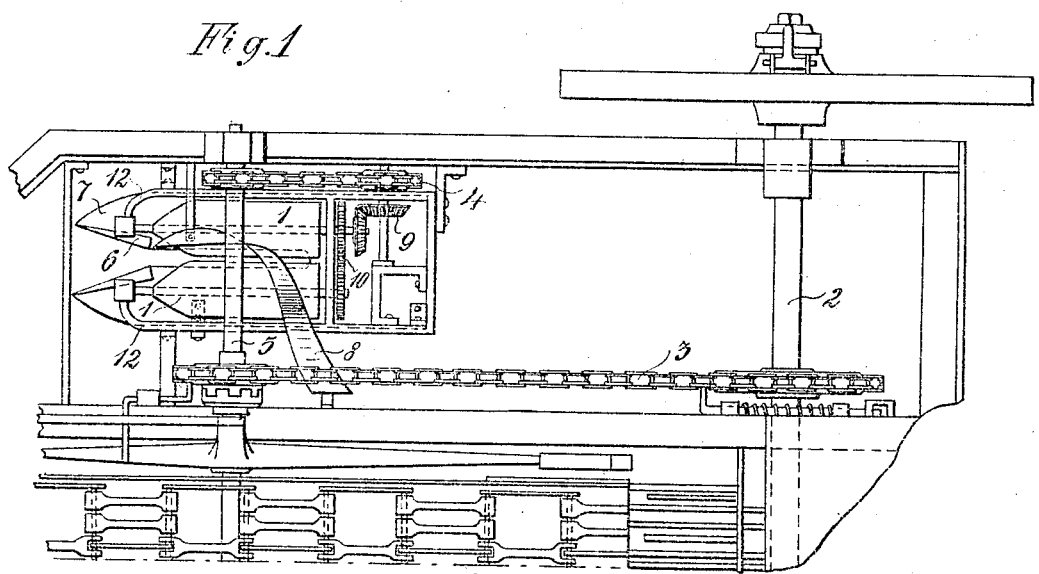
Fig.1
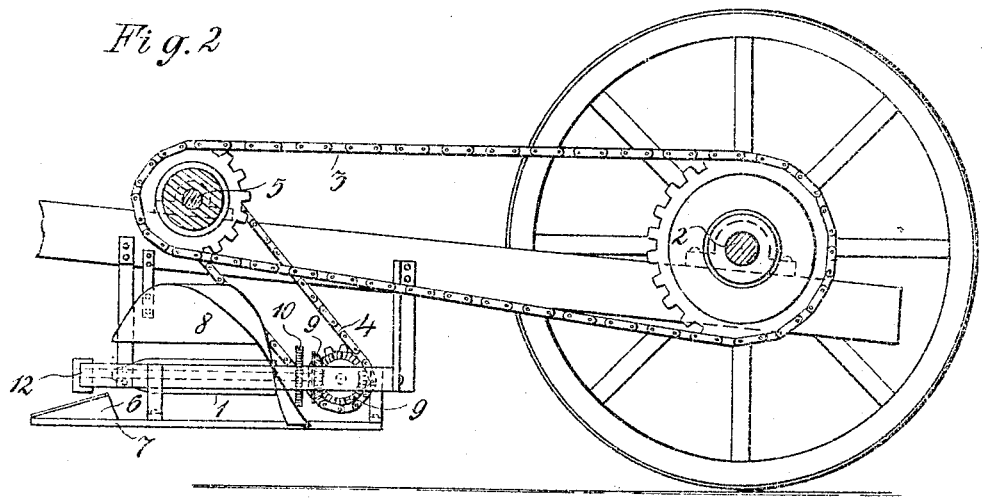
Fig.2
Fig.4
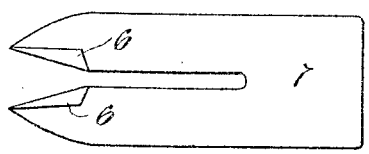
Fig.3
Witnesses:
G. S. Noble
L. Waldman
Inventor
Marcus Altstock
by B. Singer
Atty No. 764,655. Patented July 12, 1904.

UNITED STATES PATENT OFFICE.

MARCUS ALTSTOCK, OF LEMBERG, AUSTRIA-HUNGARY.

MECHANISM FOR PULLING POTATO-HALMS.

SPECIFICATION forming part of Letters Patent No. 764,655, dated July 12, 1904.

Application filed August 13, 1903. Serial No. 169,369. (No model.)

*To all whom it may concern:*

Be it known that I, MARCUS ALTSTOCK, a subject of the Emperor of Austria-Hungary, residing at 13 Kazimirgasse, Lemberg, Galicia, Austria-Hungary, have invented a new and useful Improvement in Mechanism for Pulling Potato-Halms, of which the following is a specification.

This invention relates more particularly to mechanism for pulling potato-halms, and the pulling devices are preferably operated from the rear wheels of the machine, the arrangement being such that the halms are thrown off laterally onto a row from which the potatoes have been dug.

This invention is shown in the accompanying drawings, in which—

Figure 1 is a plan view of the machine embodying this invention. Fig. 2 is a side elevation of the pulling mechanism. Fig. 3 is a cross-section of the pulling-cylinders and also shows a second position of said cylinders in dotted lines. Fig. 4 is a view showing a detail of construction.

The pulling mechanism consists of two rollers or cylinders 1, which are flattened on both sides and pointed at the forward ends. The cylinders are carried by shafts having their bearings in yielding arms 12. They are revolved in opposite directions to pull the halms, which are directed between them by means of cone-gears 9, which drive one of the shafts upon which said cylinders are mounted, and intermeshing gears 10, mounted on said shafts. One of the cone-gears is driven by a sprocket-wheel 4, which is connected, by means of a chain and corresponding sprocket-wheel, to a main shaft 5, which is in turn driven by means of spocket-wheels 3 3 and chain from the rear axle 2.

Plates or shoes 7 immediately beneath the cylinders are provided with lugs or fingers 6, which direct the halms into the space between the conical or pointed ends of the cylinders, the plate 7 preventing earth or potatoes from being thrown up with the halms. A guide-plate 8, having the form of a reversed plowshare, is provided adjacent to the upper surfaces of the cylinders, upon which the pulled halms fall and by means of which they are thrown off laterally onto a row which has already been operated upon.

It will be observed that in starting in a field the first two rows must be pulled before the machine is used.

The cylinders or rollers 1 are covered with a layer of leather, rubber, or like material, and they may also be built up of thin plates, which are connected by bolts, as shown in Fig. 3.

This pulling mechanism is preferably attached to one side of a potato-digging machine, as shown in the accompanying illustration; but it may also be used for other purposes and on other machines.

Having thus described my invention, what I claim, and desire to secure by Letters Patent, is—

1. In a machine for pulling potato-halms, the combination of two cylinders which are flattened on both sides and terminating in forwardly-pointed ends, yielding arms upon which said cylinders are mounted, intermeshing gears for driving said cylinders to cause them to coöperate for pulling the halms, and means for driving one of said cylinders from the rear-wheels axle of the machine.

2. In a machine for pulling potato-halms, the combination of two coacting cylinders flattened on both sides, coverings for said cylinders of suitable material, means for operating said cylinders, a slotted catch-plate beneath said cylinders, provided with lugs for directing the halms into the space between said cylinders, and a discharge-plate formed like a reversed plowshare for discharging the halms laterally from said cylinders.

In witness whereof I have hereunto signed my name, this 28th day of July, 1903, in the presence of two subscribing witnesses.

MARCUS ALTSTOCK.

Witnesses:
 IGNAZ S. KÜRPFELMACHER,
 ALVESTO S. HOGUE.